Feb. 4, 1958   W. LEE ET AL   2,822,005
JIG SAW ATTACHMENT
Filed Nov. 15, 1956

INVENTORS
WALTER LEE +
WILLIAM B. FOGLE
BY
*Gabriek & Gabriek*
ATTORNEYS

United States Patent Office 2,822,005
Patented Feb. 4, 1958

2,822,005

JIG SAW ATTACHMENT

Walter Lee, Towson, and William B. Fogle, Baltimore, Md., assignors to The Black & Decker Manufacturing Company, Towson, Md., a corporation of Maryland Application November 15, 1956, Serial No. 622,392

5 Claims. (Cl. 143—68)

The present invention is concerned generally with jig saws, more particularly to a jig saw attachment for use in combination with an electric hand drill as a power source and specifically to novel structure in the attachment whereby the jig saw and attachment may be secured together for deriving and obtaining in the jig saw certain functions from the drill unit.

Portable jig saws electrically powered as hand tools are known to the prior art, and so also jig saw attachments applicable to electric motor driven means such as hand tools with various mechanisms for converting rotary motion of the motor power source to reciprocating motion in a saw blade or like reciprocating tool. The present invention is directed particularly to a jig saw attachment for use with the now commonly available hand type electric drills and includes not only motion converting mechanism, the general type of which is known in the prior art, but further novel structure whereby the jig saw attachment is secured to an electric drill to give a compact, well-balanced, readily manipulatable hand tool. Further the structure of this invention provides means of improved securement and coupling to the drill, not only for derivation or communication of mechanical rotary motion, but also, as a feature of particular advantage with modern hand drills, means for directing a cooling air exhaust from the motor casing of the drill to the working area of the tool. The structure for obtaining these features has the further advantage of simplicity of construction and of application to a drill contemplated for use as the motive power source, and also a rugged trouble-free structure of relatively low cost in manufacture relative to the ends to be attained thereby.

An object of the present invention is then the provision of a jig saw attachment structure relatively simple and of low cost in manufacture having, however, improved characteristics in the means whereby the drill and attachment are secured together for communication of mechanical or other power. A further particular object is the provision of a jig saw attachment wherein the means whereby the attachment is secured to the drill also provides for direction of an exhaust ventilating air stream from the drill casing to the work area of the drill. Other objects and advantages of the invention will appear from the following description and the drawings wherein:

Figure 1:
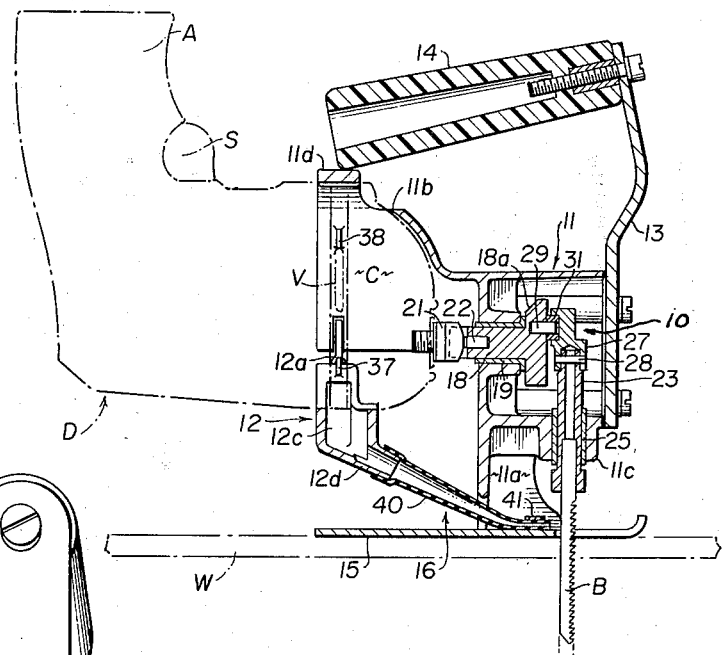
Fig. 1 is generally a longitudinal vertical section of the jig saw attachment of this invention, with a portable electric hand drill shown in dashed outline in proper operating relation thereto.
Figure 2:
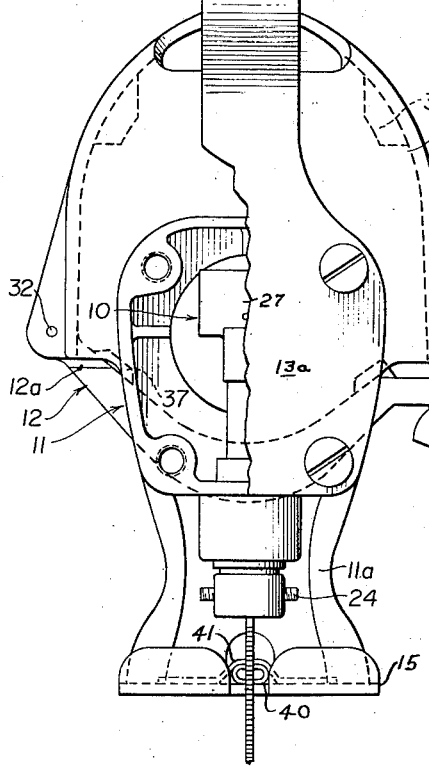
Fig. 2 is a front elevational view corresponding to Fig. 1, with some portions broken away to show certain internal structure.

In the drawings, Fig. 1, a hand type portable electric drill D, appearing in dashed outline, is shown in preferred relation to one form of jig saw attachment according to this invention, the forward end of the drill motor casing C being received and clamped in the attachment to locate and fix the rotationally driven output element or spindle of the drill in correct relation for coupling to the jig saw mechanism as hereinafter described. It may be here noted that the form disclosed in the drawings aptly positions the drill relative to the work W with the drill pistol grip A and trigger switch S turned upwardly away from and at right angles to the work for suitable operating clearance, convenient access to the drill grip and switch, and good balance of the tool resulting from the combination.

The attachment proper comprises, as principal parts, a motion converting mechanism 10 reciprocating the blade B; a forwardly open housing 11 to mount and enclose the mechanism 10, which may be fabricated as by die casting with a pedestal or leg formation 11a dependent from the back part of its lower wall, and a rearwardly open, rearwardly protecting arch-like saddle structure 11b flaring outwardly from the side and top walls to embrace the upper part of the circumference of the drill motor casing; a swing clamp element 12 cooperating with the saddle 11b in clamping the drill housing; a handle bracket 13 and handle 14; a shoe 15; and a saw dust blowing air duct means 16.

In the motion converting mechanism, here including crank shaft 18, yoke 27 with attached ram 23, the headed crank shaft 18 has a shank portion journaled in and projecting through a bushed bore in the rear wall of the housing. In the rear wall, there is about that bore a more or less central inwardly projecting cylindrical formation, reenforced by four equi-spaced radial webs, and the end of the bearing bushing 19 therein is radially flanged to provide a thrust bearing surface between the underside of the crank shaft head and the adjacent projecting wall portion. The rearwardly projecting end of the crank shaft is diametrically slotted and axially bored for the respective purposes of receiving a forwardly directed tongue on the coupling member 21 rotationally engaged and driven by the spindle of the drill; and of receiving a resilient cylindrical plug 22 of rubber or other resilient material axially interposed as a cushion between the coupling element and crank shaft. Accordingly, in reducing the axial play at the connection from drill spindle to crank by such means, hunting of the spindle with attendant impact on the motion converting mechanism elements is minimized. Here the coupling member 21 has a male threaded shank as an adapter for use of the attachment with a drill having a female threaded spindle, but the coupling may in this respect of course have any suitable form to serve as an adapter of the attachment to a particular type of spindle.

A ram element or reciprocating shaft 23, headed and adapted at its lower end to receive therein in axial alignment the shank or tank end of a blade B secured by diametrically opposed set screws 24, is slideably mounted, for reciprocation in a central longitudinal plane, by a bushing sleeve 25 in a bore through the forward portion of the bottom housing wall surrounded by a downward cylindrical integral flange formation 11c. The shouldered under end of the ram is fitted into a downwardly open socket formation of a yoke element 27 and rigidly held therein by a pin 28. A crank pin 29, projecting from the crank shaft head and engaged through the crank pin bearing 31 in a transverse slot in the rear face of the yoke, upon rotation of the crank shaft reciprocates the ram and blade in well known manner. Radially outward of the eccentric pin 29, the crank shaft head may be cut away as at 18a to compensate for the mass of the pin and its bearing.

The handle bracket 13 is a bent plate having at its lower end a flat enlargement 13a gasketed and secured by four screws passed therethrough into corner bosses of the housing to serve also as a housing cover plate, and also formed to dispose in convenient position above the housing the handle 14, secured endwise to its upper portion by a cap screw and lock washer.

The shoe 15, generally a flat plate in form with forward end curved upward and centrally slotted inward beyond blade B, is secured perpendicular to the line of ram motion to the forwardly extended flat foot formation at the bottom of the leg 11a by a pair of flat head screws.

The saddle formation 11b at its rear edge terminates in an integral thickened band portion 11d, which at opposite sides has its bottom portions slotted to receive respectively the tongued end 12a of the upwardly concave clamp member 12 swingably secured therein by a hinge pin 32, and a swing bolt 33 held by hinge pin 34. With the flat straight free end 12b of the clamp member 12 slotted to accommodate the threaded end of bolt 33 with wing nut 35 thereon, the member 12 is tightened into a cooperative clamping relation with the saddle band portion 11d to embrace the drill motor casing as shown.

Contemplating use of the attachment with electric drills wherein the forward part of the motor casing includes a circumferentially spaced series of ventilating air exhaust ports or slots V, around the locus of which the clamp 12 and band 11d are to be located, the latter elements respectively have spaced inwardly projecting integral lugs 37, 38, for engagement with such slots, the more firmly and precisely to secure the drill in and to the attachment.

Figure 3:
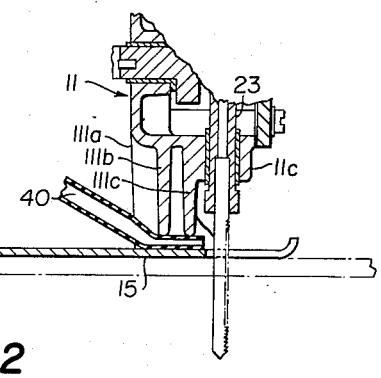
Fig. 3 is a fragmentary view showing a modified form of pedestal structure.

The member 12 at its central portion has a recess 12c into which one or more of the drill exhaust ports open, and also a short forwardly and downwardly slanted integral nipple 12d through which air exhausts from the recess 12c. A flexible hose 40 slipped over the nipple extends through a central arched opening of the pedestal foot to a point just behind the blade slot, thereby directing a blast of exhaust air forwardly across the working region of the tool to clear the work and tool of saw dust. The lower end of the hose is held and deformed to a flattened nozzle form against the shoe by a clip 41, which may be secured by interposition between shoe plate and foot forms mutually adapted to receive it as shown, or in other apt fashion. By the modification of the foot or pedestal portion shown in Fig. 3, the clip 41 is eliminated, as the means of retaining the nozzle end of the hose 40 in proper disposition may be integrally formed in the die casting constituting the housing for cooperation with the shoe 15. In the integral pedestal, the side walls 111a may be somewhat more closely spaced than the sides of the pedestal in Fig. 1, and integrally joined by a pair of spaced vertical webs 111b, 111c which are centrally notched at the bottom of the foot to accommodate the nozzle end of tube 40, compressed and held therein by the shoe plate 15 after the latter is secured to the bottom of the foot as previously described.

With the structure here disclosed, the attachment may be secured to an electric hand drill to provide a tool unit, relatively well balanced for single-handed manipulation by the handle 14, the overall manner of attachment being such as is easily accomplished for suitable mechanical cooperation and alignment of drill spindle or output and attachment input element, and further for utilization with certain hand electric drills of the drill motor ventilating air exhaust as a chip and work debris clearing means.

We claim:

1. In a jig saw attachment for use in combination with a hand electric drill or like tool having a motor casing provided with a plurality of circumferentially spaced ventilating air outlet slots or ports: a housing having top, bottom and side walls and a pedestal dependent from the rear portion of the bottom wall, a jig saw blade holding ram extending through and vertically slideably mounted in the bottom wall forward of said pedestal, an input shaft member journalled in and projecting rearwardly through the rear wall, a motion converting mechanism mounted within said housing for changing rotary motion of the input member to reciprocatory motion of the ram, a shoe plate on the foot of said pedestal having an opening therein to accommodate a blade reciprocated by said ram whereby the combination of the attachment and a drill may be supported in sliding contact with a work piece, a rearwardly extending portion on said housing and an adjustable clamping member secured thereon, said clamping member and rearwardly extending portion being adapted mutually in form as cooperating clamping elements to embrace the circumference of a drill motor casing and to hold the same in fixed relation to the housing with the drill spindle in alignment with said input member, one of said clamping elements having a cavity therein for receiving air discharged from at least one of said ports and opening through an integral nipple extending forwardly toward the housing, duct means communicating at one end with said nipple and at the other end directing air about the blade working area.

2. An attachment as described in claim 1, wherein said clamping elements are provided with integral inwardly extending lugs to engage at least some of said slots or ports of the tool and to leave part of the total area of said slots or ports open for air discharge to said cavity.

3. In a jig saw attachment as described in claim 1, an input shaft member axially bored at and diametrically slotted across its rearward end face, a coupling element adapted at one end to be rotationally drivingly engaged with a spindle or output element of said tool and at the other with an axially extended tongue projecting into said slot and a resilient element axially interposed between said tongue and said input shaft member located by said axial bore, whereby impact on the said motion converting mechanism consequential upon drill spindle axial hunting is minimized.

4. In a jig saw attachment for use in combination with a portable electric drill or like hand tool: a forwardly open housing having top, bottom and side walls and a pedestal dependent from the rear portion of the bottom wall, a jig saw blade holding ram extending through and vertically slideably mounted in the bottom wall forward of said pedestal, an input shaft element journalled centrally in and projecting rearwardly through the rear wall, a motion converting mechanism mounted within said housing for changing rotary motion of the input element to reciprocatory motion of the ram, a shoe plate on the foot of said pedestal having an opening therein to accommodate a blade reciprocated by said ram whereby the combination of the attachment and drill may be supported in sliding contact with the work, a rearwardly extending integral saddle shaped portion flaring outwardly from the side and top walls of said housing for embracing a portion of a drill motor casing, an arcuate clamping member at one end hinged to said saddle shaped portion and at the other end releasably secured to the opposite side of the saddle portion by a swing bolt and clamping nut engaged therewith, said clamping member and saddle portion being adapted mutually in form to embrace the circumference of a drill motor casing and to hold the same in fixed relation to the housing with the drill spindle in alignment with said input member, the clamping member having a cavity therein opening toward the drillward side thereof and also through an integral nipple extending forwardly toward the housing, duct means secured at one end to said nipple and at the other end to said shoe to direct about the blade working area air received from motor ventilating slots of said drill, and a handle assembly including a bracket plate with lower end secured to and forming a cover plate for the open end of said housing and a handle element secured to the upper end of said bracket plate to extend longitudinally over said housing.

5. In a tool attachment for use in combination with a hand electric drill or the like having a motor casing provided with a plurality of circumferentially spaced ventilating air outlet ports or slots: a housing having top, bottom and side walls and a pedestal dependent from the rear portion of the bottom wall, a driven tool carrying member mounted in said housing, an input shaft member journalled in and projecting rearwardly through the rear wall, a motion converting mechanism mounted within said housing for changing rotary motion of the input member into a desired motion of the tool carrying member, a work engaging member carried by said pedestal whereby the combination of the attachment and drill may be supported in sliding contact with the work, a rearwardly extending integral saddle shaped portion flaring outwardly from the side and top walls of said housing for embracing a portion of a drill motor casing, an arcuate clamping member at one end hinged to said saddle portion and at the other end releasably secured to the opposite side of the saddle portion, said clamping member and saddle portion being adapted mutually in form to embrace the circumference of a drill motor casing and to hold the same in fixed relation to the housing with the drill spindle in alignment with said input member, the clamping member having a cavity therein opening toward the drillward side thereof and also through an integral nipple extending forwardly toward the housing, and duct means secured at one end to said nipple and at the other end to said shoe to direct air received from motor ventilating slots of said drill about the tool working area.

References Cited in the file of this patent

UNITED STATES PATENTS

| | | |
|---|---|---|
| 1,460,874 | White | July 3, 1923 |
| 1,833,785 | Krieger | Nov. 24, 1931 |
| 2,282,728 | Kern | May 12, 1942 |
| 2,519,526 | Wilber | Aug. 22, 1950 |
| 2,698,621 | Fernandez | Jan. 4, 1955 |
| 2,704,941 | Holford | Mar. 29, 1955 |
| 2,746,493 | Babcock | May 22, 1956 |

FOREIGN PATENTS

| | | |
|---|---|---|
| 160,060 | Australia | Dec. 1, 1954 |
| 585,297 | Great Britain | Feb. 4, 1947 |
| 678,247 | Great Britain | Aug. 27, 1952 |

U. S. DEPARTMENT OF COMMERCE

PATENT OFFICE

CERTIFICATE OF CORRECTION

Patent No. 2,822,005                                         February 4, 1958

Walter Lee et al.

It is hereby certified that error appears in the printed specification of the above numbered patent requiring correction and that the said Letters Patent should read as corrected below.

Column 2, line 54, for "tank" read -- tang --; line 60, for "under" read -- upper --.

Signed and sealed this 1st day of April 1958.

(SEAL)
Attest:

KARL H. AXLINE
Attesting Officer

ROBERT C. WATSON
Commissioner of Patents